MOUNTING AND DISMOUNTING MEANS FOR AGRICULTURAL MACHINES

Original Filed July 15, 1963

INVENTOR

G.W. ROHWEDER

INVENTOR
G.W.ROHWEDER

MOUNTING AND DISMOUNTING MEANS FOR AGRICULTURAL MACHINES

Original Filed July 15, 1963

INVENTOR

G.W.ROHWEDER

United States Patent Office

Re. 26,512
Reissued Dec. 31, 1968

26,512
MOUNTING AND DISMOUNTING MEANS FOR AGRICULTURAL MACHINES

Glen W. Rohweder, Moline, Ill., assignor to Deere & Company, Moline, Ill., a corporation of Delaware Original No. 3,270,489, dated Sept. 6, 1966, Ser. No. 295,086, July 15, 1963. Application for reissue Dec. 21, 1966, Ser. No. 607,355
11 Claims. (Cl. 56—21)

Matter enclosed in heavy brackets [ ] appears in the original patent but forms no part of this reissue specification; matter printed in italics indicates the additions made by reissue.

*ABSTRACT OF THE DISCLOSURE*

*A mounting and dismounting arrangement of grain combine headers and other crop-handling and crop-treating units with respect to the forward supporting structure or feeder house of a typical agricultural combine so as to improve the flexibility of the basic chassis structure as a self-propelled vehicle capable of performing a wide variety of agricultural functions.*

*Cross-reference to related application*

*This application is related to and relies upon only U.S. Ser. No. 295,086, filed July 15, 1963, now Patent 3,270,489, of which the present application is a reissue.*

*Background of the invention*

*1. Field of the invention*

*As already indicated, the invention is an improvement in that class of machines including self-propelled agricultural combines and crop-treating and crop-handling components thereof incidental to the harvesting of grain, corn, etc.*

*2. Description of the prior art*

*It is known of course to equip a self-propelled combine with a conventional grain header that can be removed and be replaced with, for example, a corn harvester attachment. The problems solved by the present invention are mainly those involved in speed and ease of mounting and dismounting the header and/or other unit and the ability of the mounting and dismounting system to accommodate a wide variety of such headers and other units.*

[This invention relates to an agricultural machine and more particularly to means for mounting thereon and dismounting therefrom a mountable and dismountable unit.

The invention finds its greatest utility in the mounting and dismounting of grain headers and other crop-treating and crop-handling units on the forward supporting structure or feeder house of a typical agricultural combine, the basic chassis structure of which is finding increased use in service as a self-propelled vehicle for machinery other than the typical header. For this purpose, the invention has for its principal object the provision of improved means whereby such units may be readily mounted on and dismounted from the forward end of the feeder house or equivalent supporting structure. It is another object of the invention to provide means which may be readily connectible and disconnectible, particularly through use of the vertical adjustability of the feeder house. A further object resides in the provision of mounting and dismounting structure including portions complementing each other and including particularly a portion on the feeder house serving as a lower rear portion of the auger trough of the header. In another respect, it is a feature of the invention to utilize the last-mentioned portion as a supporting means in addition to other supporting means provided on the complementary interengageable structures. It is a further object of the invention to provide disconnectible drive means between driving and driven parts respectively on the feeder house and the mountable unit.

The foregoing and other important objects and desirable features inherent in and encompassed by the invention will become apparent as a preferred embodiment thereof is disclosed in detail in the ensuing description and accompanying sheets of drawings, the figures of which are described below:]

*Summary of the invention*

*The invention provides novel cooperative parts between the combine feeder house or equivalent support and the headers or units mounted thereon which serve, when connected, to establish the proper supporting and crop-transfer relation between the feeder house and whatever header and/or unit is used so that the ultimate machine performs efficiently and without the need for special conversion components. The speed and ease with which the vertically connectible and disconnectible mounting elements cooperate, exploited by using the vertical adjustability of the feeder house, improve the versatility of the machine, especially with respect to the use of structure on the feeder house and header or other unit that includes portions complementing each other when assembled or mounted, together with a portion on the feeder house serving as a lower rear portion of the auger trough of the header, the utilization of the last-mentioned portion as a supporting means in addition to other supporting means provided on the complementary interengageable structures and the provision of disconnectible drive means between driving and driven parts respectively on the feeder house and the mountable unit.*

*Description of the preferred embodiment*

Figure 1:
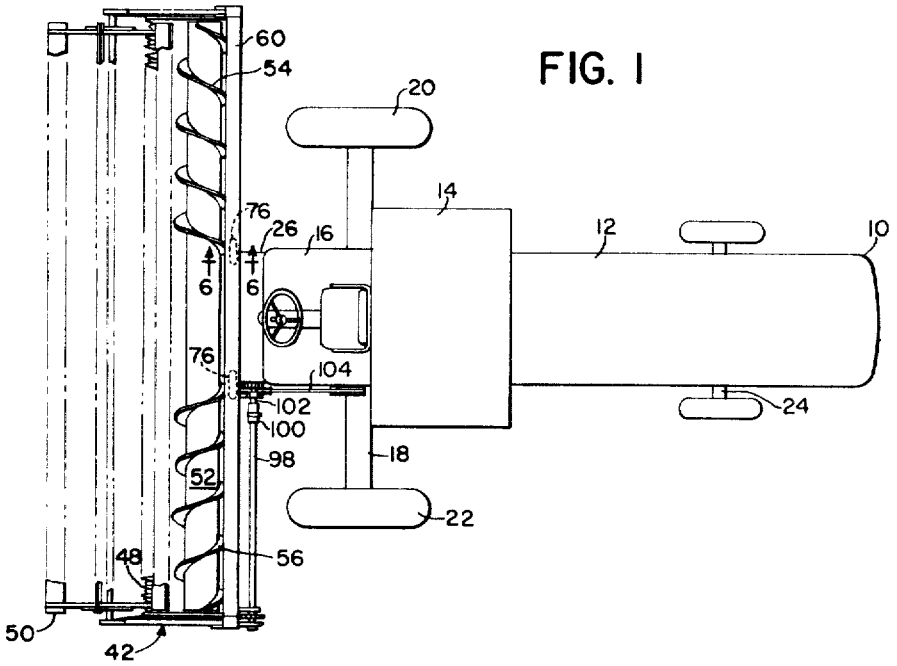
FIG. 1 is a plan view of a typical agricultural combine having a header mounted thereon.
Figure 2:
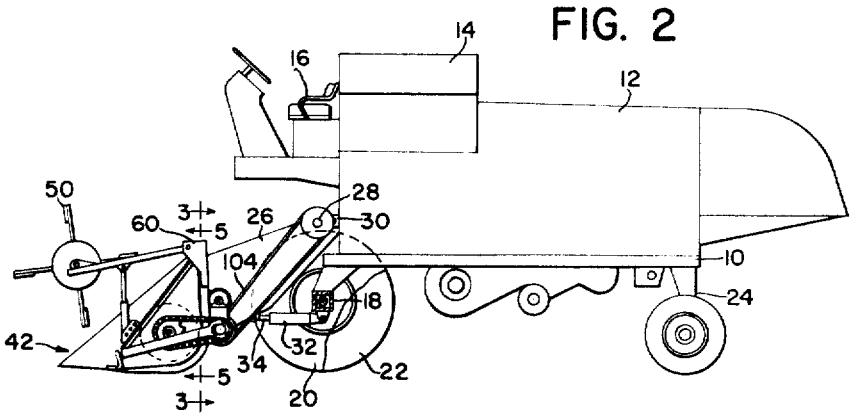
FIG. 2 is a side elevational view, with a portion of the near front wheel broken away to expose interior structure.

The agricultural vehicle or combine chassis chosen for purposes of illustration typically includes a main fore-and-aft frame or body 10 carrying a separator housing 12, grain tank 14 and forwardly disposed operator's station 16. The body or frame 10 is supported at its front end on a transverse front axle structure 18 which includes right- and left-hand traction wheels 20 and 22. The rear end of the body or frame is typically carried on a steerable wheeled axle structure 24. The separator body 12 includes the usual crop-handling mechanism, not shown here, since it is well known to those versed in the art.

The forward end of the combine body includes or carries thereon for vertical adjustment a forward supporting and crop-feeding housing or feeder house 26. Provision for vertical adjustment of the feeder house 26 is made by mounting same on a forward portion of the frame or body 10 for pivoting about a transverse axis at 28, suitable mounting structure being provided at 30. Conventional designs of this nature are numerous. Typical of these is that shown in the patent to Knollman, 3,065,590. Force-exerting means for effecting vertical adjustment of the feeder house 26 about the axis 28 here takes the form of a pair of hydraulic motors, only one of which is shown as including a cylinder 32 having a piston rod 34. One end of the cylinder is anchored to the axle housing 18 and the piston rod is connected to an under portion of the feeder house 26. Any suitable form of valve control means may be utilized for supplying fluid to or exhausting fluid from the cylinder 32, [and] *an* expedient that is well known in the art.

Figure 3:
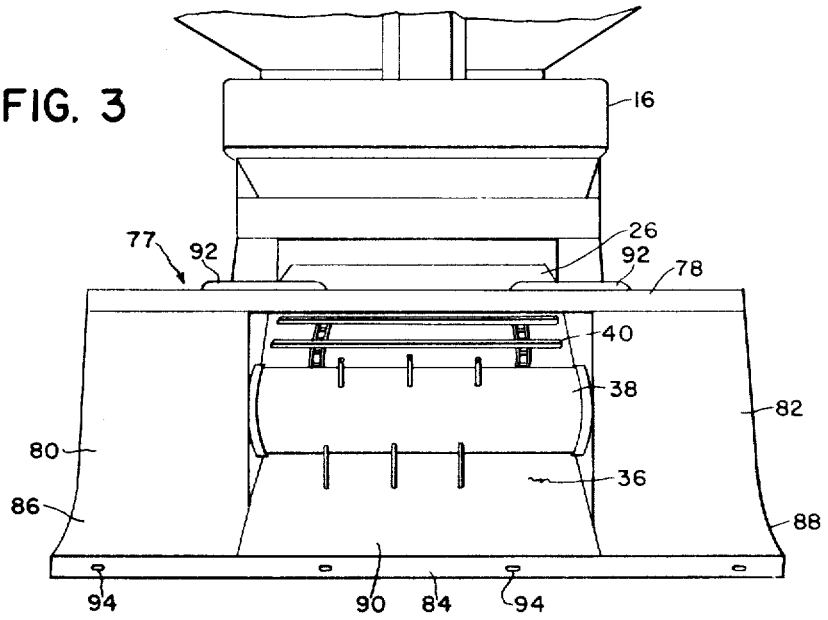
FIG. 3 is a front perspective view, on an enlarged scale, showing the forward portion of the feeder house as would be seen generally along the line 3—3 on FIG. 2.

The feeder house 26 is typically made up of angularly related walls to afford a front crop-inlet opening 36, as best shown in FIG. 3, wherein will also be seen a forward beater 38 and a raddle chain or conveyor 40 which functions conventionally to convey crops upwardly within the feeder house to the thresher cylinder (not shown) located in the forward part of the separator body 12.

Figure 4:
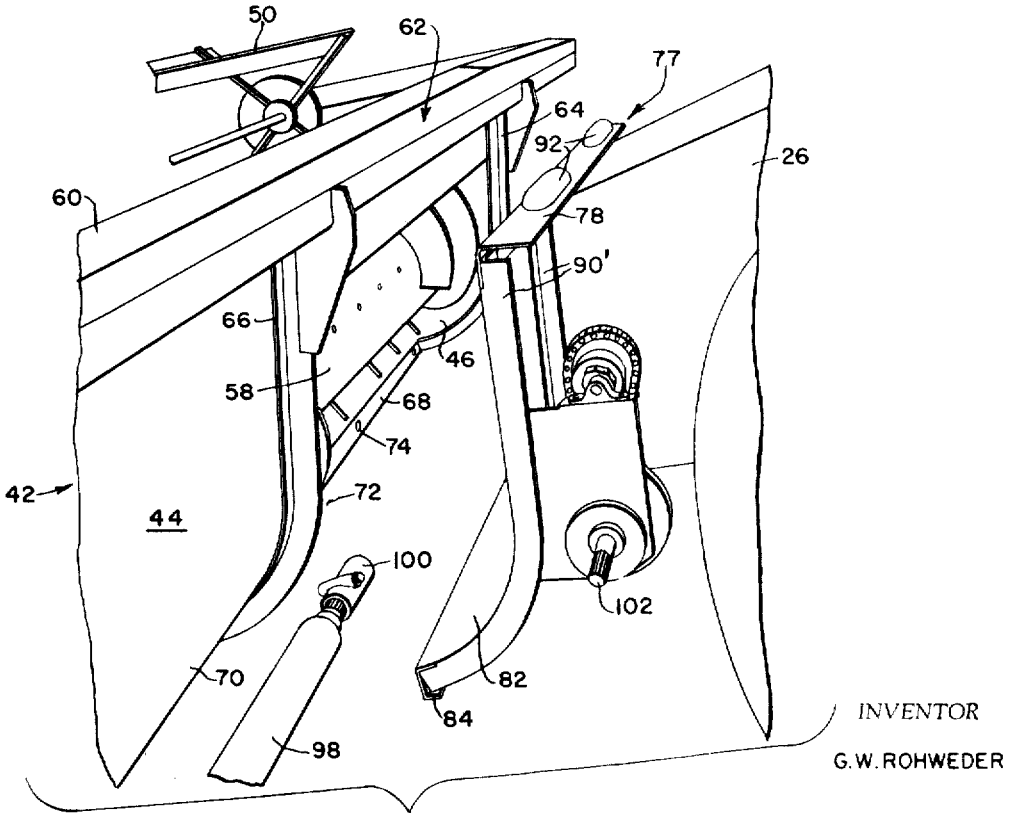
FIG. 4 is a fragmentary perspective, on an enlarged scale, showing the relationship between the feeder house and header just prior to mounting of the latter on the former.
Figure 5:
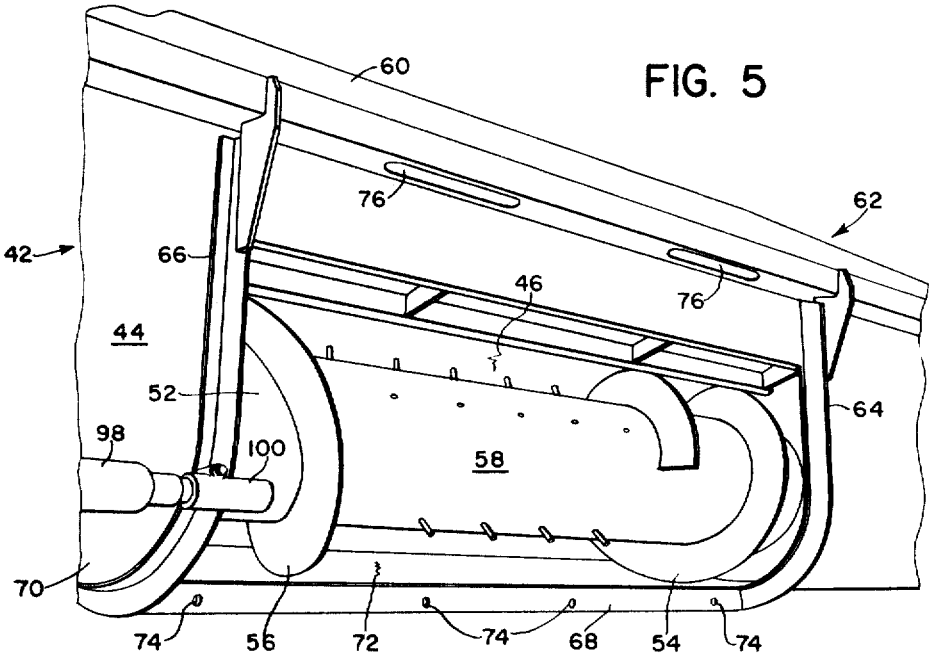
FIG. 5 is an enlarged fragmentary perspective of the rear portion of the header as would be seen generally along the line 5—5 on FIG. 2 when the header is separated from the feeder house.

In the typical combine, the feeder house opening 36 registers with an opening in the rear of a grain header. Such header is shown here at 42 and has a rear transverse generally upright rear wall 44 within which is provided a crop transfer opening 46 (FIGS. 4 and 5). It will be clear from FIG. 1 that when the header 42 is mounted on the feeder house 26, the openings 46 and 36 are in fore-and-aft register so that crops gathered by the header will be conveyed to the openings to the beater 38 and conveyor 40. The header is typically provided with cutting mechanism 48, a reel 50 and a transverse auger 52 of the character shown in the patent to Oehler 2,529,180, for example. Opposite end portions of the auger include oppositely wound helical flights 54 and 56 which operate in well-known fashion to move crops laterally inwardly to the center of the header to an intermediate beater portion 58 (FIG. 5), whence they are moved through the registered openings 46 and 36.

Figure 6:
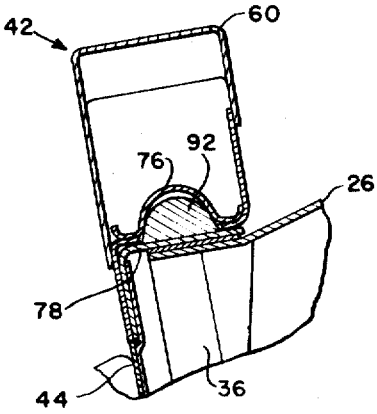
FIG. 6 is an enlarged sectional view as seen along the line 6—6 of FIG. 1.

The rear wall of the header 44 is supplemented along its top transverse edge with relatively heavy supporting structure which may take the form of a tubular beam 60, best shown in FIG. 6. This may be regarded as the top member of a mounting structure designated in its entirety by the numeral 62. This structure is supplemented at opposite sides by laterally spaced upright members 64 and 66, and at its bottom by a lower transverse member or element 68. These members or elements are all rigidly united to establish a frame about the opening 46. The wall 44 curves downwardly and forwardly to afford a trough 70 for the auger 52, but in the area intermediate the members 64 and 66, the curved trough portion is omitted so that a gap exists at 72. The lower member 68 is provided with a plurality of apertures 74, for purposes that will presently appear.

As best shown in FIGS. 5 and 6, the underside of the tubular beam 60 intermediate the upright members 64 and 66 is provided with vertically—here downwardly—opening sockets 76. These may be formed in any suitable manner in the underside of the beam and cooperate in providing vertically connectible and disconnectible means in association with socket-receiving means on the front end of the feeder house.

For this purpose, the mounting structure 62 is supplemented by a second structure 77, here made up of a frame including a transverse upper or top member or element 78, a pair of generally upright side members 80 and 82 and a transverse bottom or lower member 84. As best seen in FIGS. 3 and 4, the members just described frame the feeder house inlet opening 36. The members 80 and 82 are of sheet-like nature and extend laterally to opposite sides of the opening, and each of these is curved downwardly and forwardly, respectively at 86 and 88 to cooperate with a feeder house floor forward portion 90 in closing the gap 72 between the upright elements 64 and 66 of the header mounting structure 62. The sheet-like portions 80 and 82 are of course backed up or reinforced by appropriate frame members such as those shown at 90.

Rigidly formed on or otherwise secured to the top member 78 of the structure 77 are a pair of socket-receiving means 92, and provided in the lower transverse member 84 are a plurality of apertures 94.

Figure 7:
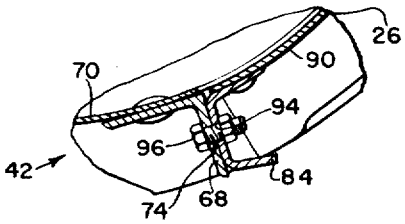
FIG. 7 is an enlarged sectional view showing the lower connecting and disconnecting means.

Since the sockets 76 in the structure 62 open downwardly, the socket-receiving elements 92 project upwardly. The two combine to establish connectible and disconnectible means, the sockets 76 respectively receiving the means 92 when the header or comparable unit on which such structure is provided is mounted on the forward end of the feeder house (FIG. 6). To complete the assembly, a plurality of additional disconnectible fastener means, such as bolts 96 is used between the members 68 and 84, it being clear of course that one bolt and accompanying nut will be used for each pair of registering apertures 74–94 (FIG. 7). Further, when the mounting is established, the curved forward portion 86–88–90 of the feeder house structure 77 will supplement the bottom rear portion of the header so as to close the gap at 72, the portions just referred to completing the auger housing 70. The lateral outer edges of the portions 80 and 82 will lie just inwardly of the members 64 and 66, respectively, so that the latter overlap the former to establish a crop-tight seal, whereby crops transferred through the registered header and feeder house openings 46 and 36 will not be lost.

The header is provided with the usual drivable parts, for example the cutting mechanism and reel already described. Drive to this is established by means of a header-carried drivable shaft 98 *having* thereon an axially shiftable coupling 100. The feeder house carries a driving shaft or part 102 which is typically driven in any suitable manner, as by a belt or chain 104, which in turn is driven from the combine power source, as in the above-noted patent to Oehler. In the present case, when the header is mounted (FIG. 1) the coupling 100 is utilized to coaxially connect the shafts 98 and 102. When it is desired to dismount the header, the coupling 100 can be released and slid axially on the splined end of the shaft 98 so as to separate it from the feeder house shaft 102 (FIG. 4).

In use and operation the means for mounting and dismounting the header or comparable unit on and from the supporting structure established by the feeder house, the two structures 62 and 77 cooperate and complement each other to establish a readily connectible and disconnectible means. For example, let it be assumed that the header 42 is dismounted. It may be appropriately blocked or supported in substantially its normal position. The combine may then be driven forwardly, with the feeder house structure 77 generally in fore-and-aft alinement with the structure 62, but with the feeder house structure member 78 at a lower level, effected by exhausting fluid from the feeder house adjusting cylinders 32. When the structures are in fore-and-aft register, the feeder house may be raised by expanding the cylinders 32, whereby the means 92 on the feeder house structure 77 enters the sockets 76 on the header structure 62. Since the lower forward portion 86–88–90 of the feeder house structure extends forwardly beneath the header, it will serve as means for temporarily supporting the header, following which it is a relatively simple matter to install the bolts and nuts 96. The shafts 98 and 102 will then be substantially in axial alinement, and the coupling 100 may be slid axially onto the splined end of the shaft 102 and tightened to establish the driving connection.

Dismounting is accomplished by a reversal of the foregoing procedure; that is, the feeder house is somewhat elevated, carrying with it of course the header, after which the header may be appropriately blocked, the fasteners 96 removed, the coupling 100 disconnected, and the feeder house lowered to withdraw the means 92 from the sockets 76.

Thus there is provided a simple and convenient mounting and dismounting arrangement. Features and advantages other than those enumerated will readily occur to those versed in the art, as will many modifications and alterations in the preferred embodiment disclosed, all of which may be achieved without departure from the spirit and scope of the claims.

What is claimed is:

1. In a mobile agricultural machine having a fore-and-aft body including a vertically adjustable forward supporting and crop-feeding housing provided with a front end crop inlet opening, and a transverse header ahead of said housing and including a rear generally upright wall provided with a crop-transfer opening registrable fore-and-aft with the inlet opening, the improvement residing in means for mounting and dismounting the header on and from the housing, comprising: first and second structures rigidly secured respectively to the housing and header in proximity to the respective openings and including vertically connectible and disconnectible means having cooperative elements respectively on said structures enabling vertical connection and disconnection thereof upon opposite vertical adjustment of the housing; and additional disconnectible fastener means connectible between said structures when said elements are connected.

2. The invention defined in claim 1, in which: the header includes a transverse auger trough interrupted in part by the header opening and thus having a gap therein fore-and-aft register with said header opening; and means is carried by the housing including a lower forward part projecting into and filling said gap to complete the auger trough.

3. The invention defined in claim 1, in which: said structures are frame-like and complement each other when the header is mounted on the housing, each structure including transverse upper and lower members and generally upright opposite side members generally surrounding the respective opening, and said cooperative elements are respectively on the upper members.

4. The invention defined in claim 3, in which: one element is a socket facing vertically and the other element is a projecting part adapted to vertically enter and withdraw from the socket.

5. In a mobile agricultural machine having a fore-and-aft body including a vertically adjustable forward supporting and crop-feeding housing provided with a front end crop inlet opening, and a mountable and dismountable unit ahead of said housing and including a rear generally upright wall, the improvement residing in means for mounting and dismounting the unit on and from the housing, comprising: first and second structures rigidly secured respectively to the housing and unit and including vertically connectible and disconnectible means having cooperative elements respectively on said structures enabling vertical connection and disconnection thereof upon opposite vertical adjustment of the housing; and additional disconnectible fastener means connectible between said structures when said elements are connected.

6. In a mobile agricultural machine having a fore-and-aft body including a forward supporting and crop-feeding housing provided with a front end crop inlet opening, and a mountable and dismountable unit ahead of said housing and including a rear generally upright wall, the improvement residing in means for mounting and dismounting the unit on and from the housing comprising: a first frame-like structure rigidly secured to the front end of the housing in surrounding relation to the opening and having transverse upper and lower members; a second, complementary frame-like structure rigidly secured to the rear of the unit and having transverse upper and lower members; vertically opening socket means on one upper member; vertically projecting socket-receiving means on the other upper member for engagement with and disengagement from the socket means; and separable fastener means operative to connect and disconnect the lower members.

7. The invention defined in claim 1, in which: the header includes a drivable part, the housing includes a coaxial driving part, and an axially separable driving connection is provided between said parts.

8. The invention defined in claim 5, in which: the unit includes a drivable part, the housing includes a coaxial driving part, and an axially separable driving connection is provided between said parts.

9. In a mobile agricultural machine having a fore-and-aft body including a vertically adjustable forward supporting and crop-feeding housing provided with a front end crop inlet opening, and a transverse header ahead of said housing and including a rear generally upright wall provided with a crop-transfer opening registrable fore-and-aft with the inlet opening, the improvement residing in means for mounting and dismounting the header on and from the housing, comprising: first and second structures rigidly secured respectively to the housing and header in proximity to the respective openings and including vertically connectible and disconnectible means having cooperative elements respectively on a forward upper portion of the first structure and a rearward upper part of the second structure, said elements being vertically engageable responsive to raising of the housing relative to the header whereby the housing picks up and sustains the header via said elements and the weight of the header causes lower portions of said structures to abut each other, said elements being vertically disengageable upon lowering of the housing relative to the header so as to free the housing and header for relative fore-and-aft separation; and additional disconnectible fastener means connectible between said structures at said lower portions thereof when said elements are connected and operative to hold the structures against both vertical and fore-and-aft separation, said additional means being disconnectible between said lower portions to enable lowering of the housing relative to the header so as to vertically disengage said elements.

10. In a mobile agricultural machine having a fore-and-aft body including a vertically adjustable forward supporting and crop-feeding housing provided with a front end crop inlet opening, and a mountable and dismountable unit ahead of said housing and including a rear generally upright wall, the improvement residing in means for mounting and dismounting the unit on and from the housing, comprising: first and second structures rigidly secured respectively to the housing and unit and including vertically connectible and disconnectible means having cooperative elements respectively on a forward upper portion of the first structure and a rearward upper part of the second structure, said elements being vertically engageable responsive to raising of the housing relative to the unit whereby the housing picks up and sustains the unit via said elements and the weight of the unit causes lower portions of said structures to abut each other, said elements being vertically disengageable upon lowering of the housing relative to the unit so as to free the housing and unit for relative fore-and-aft separation; and additional disconnectible fastener means connectible between said structures at said lower portions thereof when said elements are connected and operative to hold the structures against both vertical and fore-and-aft separation, said additional means being disconnectible between said lower portions to enable lowering of the housing relative to the unit so as to vertically disengage said elements.

*11. The invention defined in claim 1, in which the crop-feeding housing has wall means, including laterally spaced apart side walls defining the inlet opening, the crop-transfer opening in the header wall has a substantially greater width than the inlet opening so that at least a portion of said crop-transfer opening extends laterally beyond the respective side wall, and sheet means is provided supplemental to the header wall and said respective side wall for closing said header opening portion.*

References Cited

The following references, cited by the Examiner, are of record in the patented file of this patent or the original patent.

UNITED STATES PATENTS

| | | | |
|---|---|---|---|
| 2,864,224 | 12/1958 | West | 56—2 |
| 2,867,958 | 1/1959 | Allen | 56—21 |

ANTONIO F. GUIDA, *Primary Examiner.*

U.S. Cl. X.R.

56—2